United States Patent
Kobayashi et al.

(10) Patent No.: US 8,218,057 B2
(45) Date of Patent: *Jul. 10, 2012

(54) IMAGING APPARATUS, USER INTERFACE, AND ASSOCIATED METHODOLOGY FOR A CO-EXISTENT SHOOTING AND REPRODUCTION MODE

(75) Inventors: Motoki Kobayashi, Tokyo (JP); Miwako Yoritate, Tokyo (JP); Yoshimitsu Funabashi, Tokyo (JP); Shinichi Iriya, Kanagawa (JP); Kayo Sasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,179

(22) Filed: Mar. 30, 2010

(65) Prior Publication Data

US 2010/0182481 A1     Jul. 22, 2010

Related U.S. Application Data

(63) Continuation of application No. 11/568,810, filed as application No. PCT/JP2005/008658 on May 2, 2005.

(30) Foreign Application Priority Data

May 13, 2004 (JP) ................................. 2004-143438
May 13, 2004 (JP) ................................. 2004-143439

(51) Int. Cl.
*H04N 5/222* (2006.01)
(52) U.S. Cl. .................... 348/333.11; 348/239
(58) Field of Classification Search ............. 348/333.11, 348/239
See application file for complete search history.

(56) References Cited

U.S. PATENT DOCUMENTS 5,138,460 A * 8/1992 Egawa .......................... 348/239
(Continued)

FOREIGN PATENT DOCUMENTS

CN    1148954    5/2004
(Continued)

OTHER PUBLICATIONS

Japanese Office Action issued on Sep. 14, 2010 in corresponding Japanese Application No. 2004-143439.

(Continued)

*Primary Examiner* — Jason Chan
*Assistant Examiner* — Gary C Vieaux
(74) *Attorney, Agent, or Firm* — Oblon, Spivak, McClelland, Maier & Neustadt, L.L.P.

(57) ABSTRACT

A currently captured image R of an object is displayed nearly at a center portion of a display frame SC on a display screen ST1 that is a shooting mode. When a time dial 22 is rotated for one step in the counterclockwise direction, the currently captured image R is moved rightward. A reproduced image P1 captured before the currently captured image R is displayed on the left thereof. A reproduced image P2 captured before the reproduced image P1 is displayed on the left thereof. The currently captured image R and the reproduced images P1 and P2 are displayed at the same time on a display screen ST2 as a co-existent state of a shooting mode and a reproducing mode. When the time dial 22 is rotated for one step in the counterclockwise direction, only the reproduced images P1 to P4 are displayed on a display screen ST3 that is a reproducing mode. As a plurality of reproduced images, the reproduced images P1 to P4 are displayed along a time axis.

20 Claims, 13 Drawing Sheets

U.S. PATENT DOCUMENTS

| | | | |
|---|---|---|---|
| 6,122,003 A | 9/2000 | Anderson | |
| 6,137,534 A | 10/2000 | Anderson | |
| 6,515,704 B1 * | 2/2003 | Sato | 348/333.11 |
| 6,570,582 B1 * | 5/2003 | Sciammarella et al. | 345/660 |
| 7,034,879 B2 | 4/2006 | Yamashita | |
| 7,053,951 B2 | 5/2006 | Miller et al. | |
| 7,136,096 B1 * | 11/2006 | Yamagishi et al. | 348/218.1 |
| 7,428,007 B2 | 9/2008 | Kitaguchi et al. | |
| 7,430,008 B2 * | 9/2008 | Ambiru et al. | 348/333.12 |
| 7,480,002 B2 | 1/2009 | Goh et al. | |
| 7,525,580 B2 * | 4/2009 | Yoshino | 348/240.2 |
| 2001/0015762 A1 * | 8/2001 | Suzuki et al. | 348/333.05 |
| 2002/0008765 A1 | 1/2002 | Ejima et al. | |
| 2002/0064387 A1 * | 5/2002 | Miyake et al. | 396/429 |
| 2003/0081135 A1 | 5/2003 | Boll | |

FOREIGN PATENT DOCUMENTS

| | | |
|---|---|---|
| JP | 1-120975 A | 5/1989 |
| JP | 10-32734 | 2/1998 |
| JP | 10-243273 | 9/1998 |
| JP | 11-85450 A | 3/1999 |
| JP | 2001-313861 A | 11/2001 |
| JP | 2001-320610 | 11/2001 |
| JP | 2002-157043 A | 5/2002 |
| JP | 3403324 | 2/2003 |
| JP | 2003-263256 | 9/2003 |
| WO | WO 99/12341 | 3/1999 |

OTHER PUBLICATIONS

Japanese Office Action issued on Sep. 14, 2010 in corresponding Japanese Application No. 2009-190795.

* cited by examiner

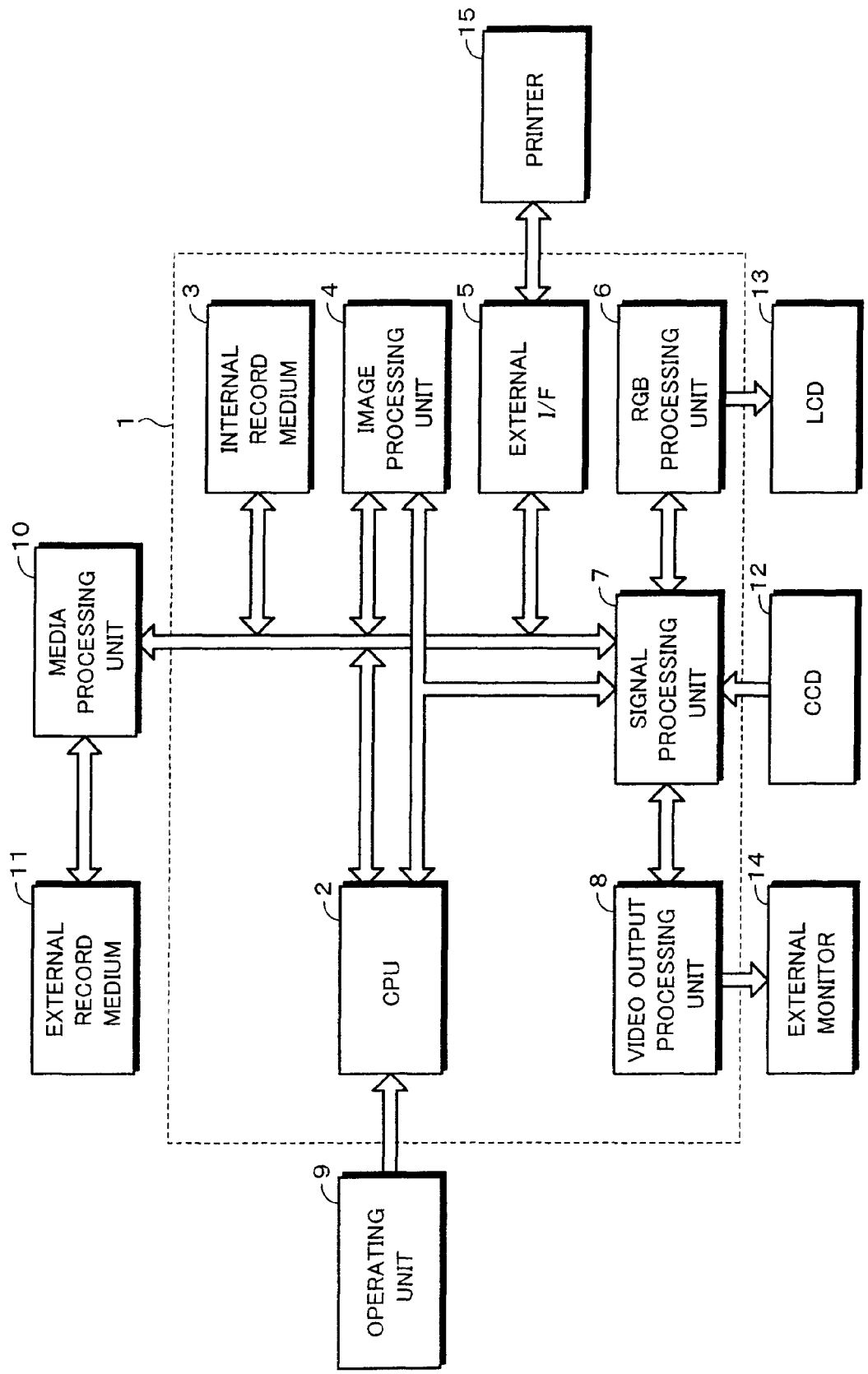

+

↓

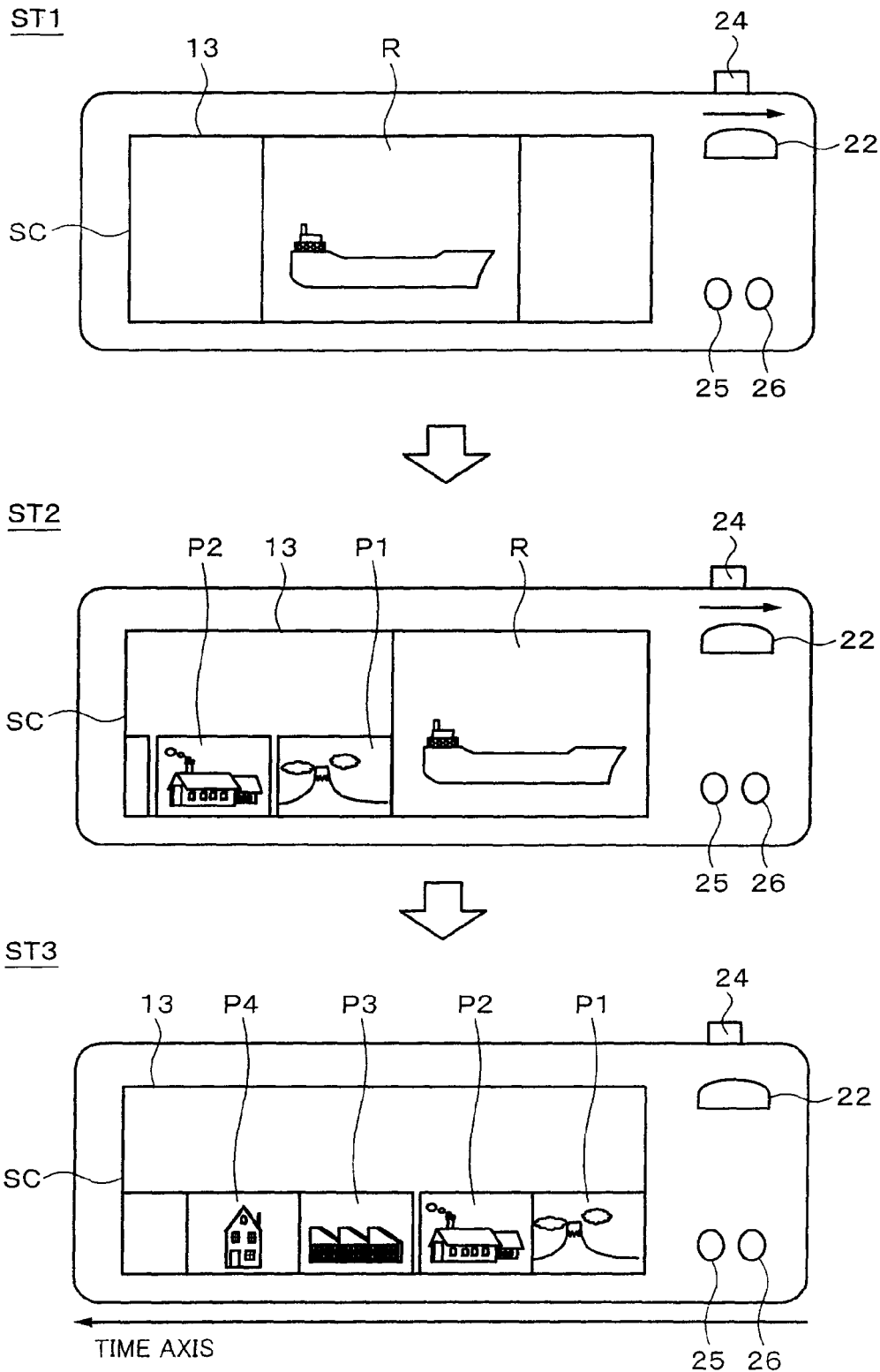

Fig. 7
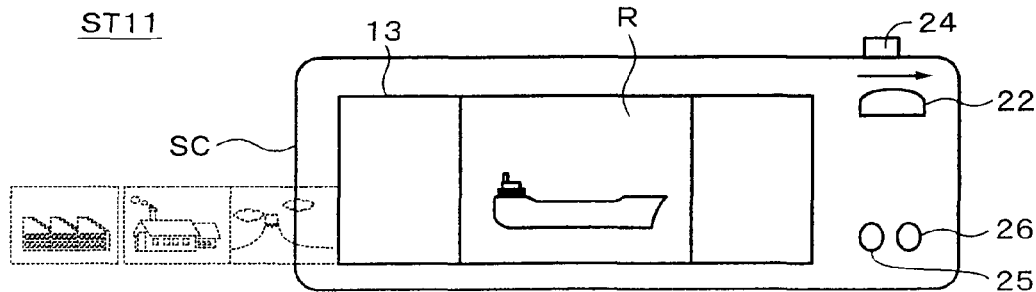
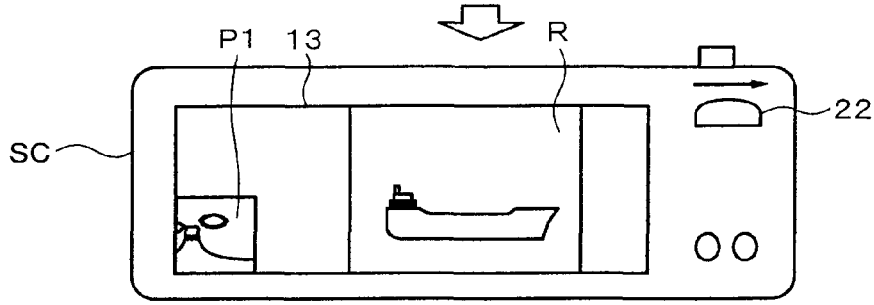
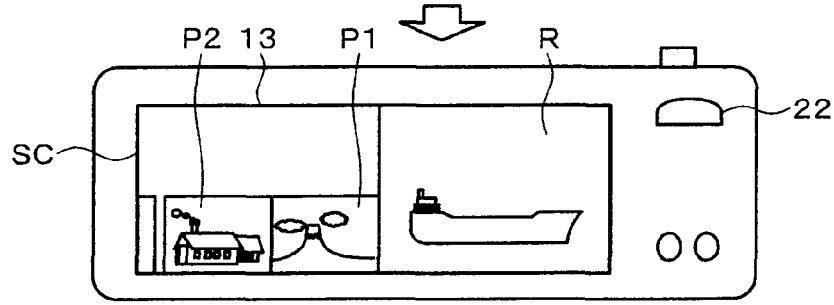
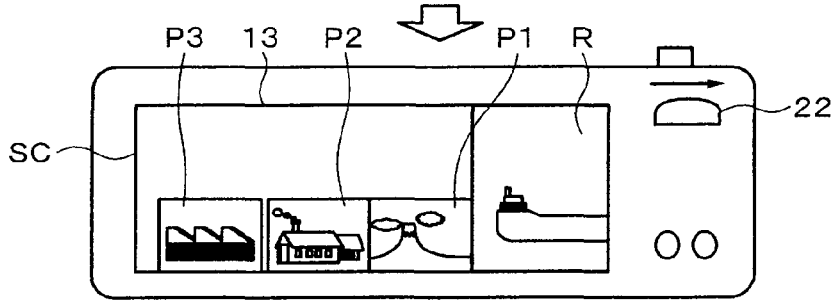
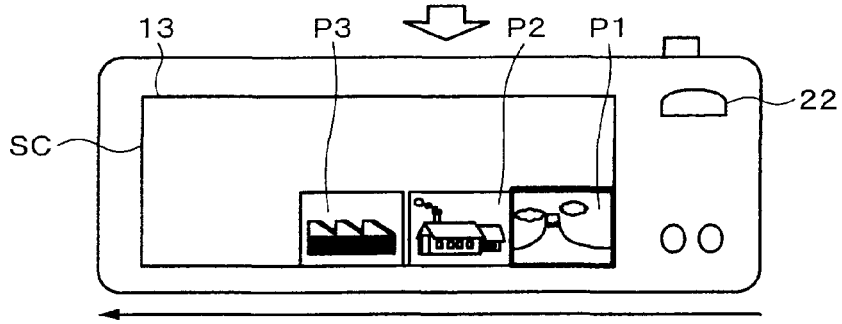
TIME AXIS

IMAGING APPARATUS, USER INTERFACE, AND ASSOCIATED METHODOLOGY FOR A CO-EXISTENT SHOOTING AND REPRODUCTION MODE

CROSS-REFERENCE TO RELATED APPLICATIONS

This application is a continuation of U.S. application Ser. No. 11/568,810, filed Nov. 8, 2006, the entire contents of which are incorporated herein by reference. U.S. application Ser. No. 11/568,810 is the National Stage of PCT/JP05/08658 filed May 2, 2005 and is based upon and claims the benefit of priority from prior Japanese Patent Application No. 2004-143439, filed May 13, 2004, and Japanese Patent Application No. 2004-143438, filed May 13, 2004.

TECHNICAL FIELD

The present invention relates to an imaging apparatus, a screen displaying method, and a user interface that allow transitions between a shooting mode and a reproducing mode to smoothly take place.

BACKGROUND ART

Digital cameras that have a displaying device for example an LCD (Liquid Crystal Display) with a relatively large screen have been widespread. When an object is shot, the LCD is used to set a composition, an angle of view, and so forth. In addition, when a recorded image is reproduced, the LCD is used to display the reproduced image.

An electronic camera that can shoot moving images and still images and that can display them in the order of days, months, and years of which they were shot along a time axis is described in the specification of Japanese Patent No. 3403324. The digital camera described in the document displays captured images so that they can be easily searched for an image to be reproduced.

The conventional digital camera needed an operation of an input device to switch a mode between a shooting mode and a reproducing mode. As a result, since the shooting mode and the reproducing mode were separated, for example it was difficult for the user to shoot an image while checking an image that has been just captured. It is preferred that a user interface of a digital camera be predictable and intuitional by a plurality of users. It can be said that such an interface has an affinity with a user's conceptual model. The electronic camera described in the specification of Japanese Patent No. 3403324 deals with only images that were captured. Thus, the specification does not mention an image captured in the shooting mode. The specification does not mention that modes are switched having an affinity with the user's conceptual model.

In addition, when a recorded image needed to be deleted, after the shooting mode was switched to the reproducing mode, the recorded image needed to be deleted. Thus, the operability of the digital camera was not good.

Therefore, an object of the present invention is to provide an imaging apparatus, a screen displaying method, and a user interface that allow a shooting mode and a reproducing mode to be switched having an affinity with a seamless conceptual model and thereby their operability to be improved.

Another object of the present invention is to provide an imaging apparatus, a screen displaying method, and a user interface that allow a shooting mode and a reproducing mode to co-exist and thereby their operability to be improved.

DISCLOSURE OF THE INVENTION

To solve the foregoing problem, a first aspect of the present invention is an imaging apparatus, comprising: an imaging unit; a display; a storage which temporarily stores an image signal which is output from the imaging unit and an image signal which is output to the display; an input unit which accepts an operation input of a user; and a control unit which controls writing and reading of the storage, wherein the control unit controls the storage so that a first image signal as an image signal of an object which the imaging unit is currently capturing and a second image signal which has been already captured are successively displayed along a time axis on the display, and wherein the control unit controls the storage so that transitions from one of a shooting mode in which the first image signal is displayed on the display and a reproducing mode in which only the second image signal is displayed on the display to the other seamlessly take place according to an operation input from the input unit.

A second aspect of the present invention is a screen displaying method of displaying image signals for an imaging apparatus having a display, the method comprising the steps of: displaying a first image signal which is an image signal of an object which an imaging unit is currently capturing on the display when a shooting mode takes place; displaying only a second image signal which has been already captured on the display when a reproducing mode takes place; and causing transitions from one mode of the shooting mode and the reproducing mode to the other mode to seamlessly take place according to an operation input.

A third aspect of the present invention is a user interface for an imaging apparatus, comprising: a display; an input unit which is operable in at least two directions; a shooting mode in which a first image signal as an image of an object which an imaging unit is currently capturing is displayed on the display; and a reproducing mode in which only a second image signal which has been already captured is displayed on the display, wherein transitions from one mode of the shooting mode and the reproducing mode to the other mode seamlessly take place according to the directions of the operation of the input unit.

A fourth aspect of the present invention is an imaging apparatus, comprising: an imaging unit; a display; a storage which temporarily stores an image signal which is output from the imaging unit and an image signal which is output to the display; an input unit which accepts an operation input of a user; and a control unit which controls writing and reading of the storage, wherein the control unit controls the storage so that a first image signal as an image signal of an object which the imaging unit is currently capturing and a second image signal which has been already captured are displayed at the same time, but the first image signal and the second image signal do not overlap.

A fifth aspect of the present invention is an image signal displaying method for an imaging apparatus having a display, comprising the step of:

displaying a first image signal as an image signal of an object which an imaging unit is currently capturing and a second image signal which has been already captured at the same time so the first image signal and the second image signal do not overlap.

A sixth aspect of the present invention is a user interface for an imaging apparatus having a display, wherein a first image signal as an image signal of an object which an imaging unit is currently capturing and a second image signal which has been already captured at the same time are displayed so the first image signal and the second image signal do not overlap.

According to the present invention, regardless of whether the current mode is the shooting mode or the reproducing mode, folders can be switched using direction keys. In addition, with up and down keys of directional keys or left and right keys thereof, folders or image files are switched. Thus, folders and image files can be switched in the same manner as a film changing operation and a film feeding operation. Since folders can be directly switched, their operations can be simplified.

In addition, according to the present invention, since an image that is being currently captured (this image may be hereinafter referred to as a currently captured image) and an image that has been captured immediately after the currently captured image and that has been recoded (this image may be hereinafter referred to as a recoded image) are displayed at the same time, while the recorded image is being observed, a newly shot object, its composition, and so forth can be decided. In addition, according to the present invention, since the shooting mode and the reproducing mode co-exist, the modes can be seamlessly switched. In addition, while an image is being captured, a recorded image can be deleted without need to switch the modes.

BRIEF DESCRIPTION OF DRAWINGS

FIG. 1 is a block diagram showing a structure of an imaging apparatus according to an embodiment of the present invention.

FIG. 5 is a schematic diagram showing transitions of display screens on a wide LCD when modes are switched.

FIG. 7 is a schematic diagram showing animations of transitions of display screens on the wide LCD when modes are switched.

BEST MODES FOR CARRYING OUT THE INVENTION

Figure 2A:
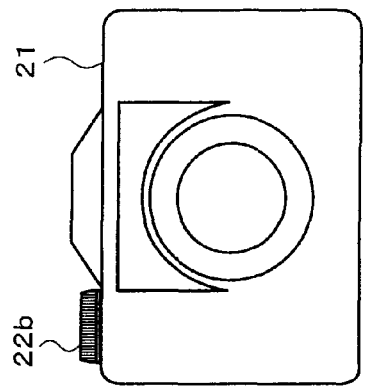
FIG. 2 is a schematic diagram describing one example and another example of a time dial according to the embodiment of the present invention.

Next, with reference to the accompanying drawings, an embodiment of the present invention will be described. FIG. 1 shows an example of a structure of a digital camera according to an embodiment of the present invention. In FIG. 1, a block surrounded by dotted lines is a processing unit controlled by a CPU (Central Processing Unit) 1.

The processing unit 1 is composed of an internal record medium 3, for example a RAM, an image processing unit 4, an external interface 5, an RGB processing unit 6, a signal processing unit 7, and a video output processing unit 8. An operating unit 9 is connected to the CPU 2. Signals corresponding to operations for a shutter and so forth disposed on the operating unit 9 are supplied to the CPU 2.

Data of which an image signal has been compressed according to for example JPEG (Joint Photographic Experts Group) are recorded to an external record medium 11 through a media processing unit 10. The external record medium 11 is an optical disc, a memory card, or the like on which data can be written.

An image signal captured by a CCD (Charge Coupled Device) 12 that is an image sensor is supplied to the signal processing unit 7. The signal processing unit 7 processes the captured image signal. The signal processing unit 7 outputs the image signal captured by the CCD 12 regardless of an input from the operating unit 9. The captured image signal is stored in the internal record medium 3. While an object is being captured, an image stored in the internal record medium 3 is usually updated. Data writing, data reading, and so forth for the internal record medium 3 are controlled by the CPU 2.

The captured image signal is supplied from the internal record medium 3 to the RGB processing unit 6 through the signal processing unit 7. A display image signal formed by the RGB processing unit 6 is supplied to an LCD (Liquid Crystal Display) 13 that is a display unit. For example, the LCD 13 is disposed on the rear surface of the camera body. Not only an image signal captured by the CCD 12 and an image signal that is read from the external record medium 11 through the media processing unit 10 are displayed on the LCD 13.

When the shutter of the operating unit 9 is pressed, the image signal stored in the internal record medium 3 is converted into for example a JPEG image file by the image processing unit 4. The image file is stored as data different from a captured image signal to the internal record medium 3. The image file that is read from the internal record medium 3 is stored in the external record medium 11 through the media processing unit 10.

A captured image is always updated and displayed on the LCD 13. The captured image and OSD data such as a reduced image of recorded image data and icons are combined by the signal processing unit 7 and displayed on the LCD 13. The OSD (On Screen Display) is a general term that denotes a memory area and a mechanism that prepare data of icons and so forth that are combined with a real time image captured by the camera.

When OSD data are generated, latest image data recorded on the external record medium 11 are obtained. The image processing unit 4 converts the obtained image data into image data corresponding to a size of the OSD. The converted image data are stored in an OSD display area of the internal record medium 3. When an OSD display size image corresponding to an image that has been just captured is stored in the internal record medium 3, it is not necessary to read data from the external record medium 11. The image processing unit 4 is controlled by the CPU 2 so that the image processing unit 4 performs an enlarging or reducing process for an image to be displayed corresponding to user's operations for keys and so forth on the operating unit 9.

An analog color video signal is supplied from the video output processing unit 8 and extracted from a video output terminal (not shown). When an external monitor 14 is connected to the video output terminal, an image stored in the internal record medium 3 or the external record medium 11 can be displayed on the external monitor 14. In addition, for example a printer 15 is connected to the external interface 5. The printer 15 can print an image.

Figure 2B:
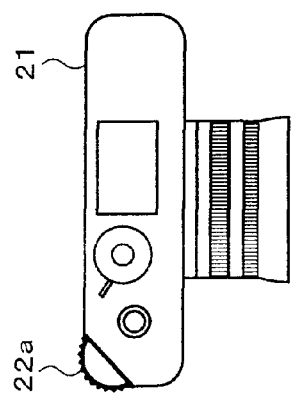

The operating unit 9 includes a time axis operation dial. FIG. 2A shows an example of the time axis operation dial. A time axis operation dial 22a slightly protrudes from a rear surface and a side surface of a camera body 21. In an example shown in FIG. 2B, a time axis operation dial 22b is disposed on a top surface of the camera body 21.

The time axis operation dials 22a and 22b have the same shape and sense of operation as a windup dial of a sliver salt film camera. In other words, the time axis operation dials 22a and 22b can be rotated for a predetermined amount in each step. Viewed from the top surface of the camera body 21, the time axis operation dials 22a and 22b can be rotated in the clockwise direction and the counterclockwise direction. In the following description, the time axis operation dials 22a and 22b are generally referred to as the time dial 22.

Instead of the dial, the time axis may be operated by an input device such as a cross key, a roller, a track ball, a touch panel, or the like. When edge portions of a cross shape operation portion of the cross key (these edge portions are referred to as a left button, a right button, an up button, and a down button) are pressed, moving directions of the cursor are designated to upward, downward, leftward, and right ward, respectively. The time dial 22 is not limited to a mechanical structure. Instead, a GUI (Graphical User Interface) that operates buttons or the like on the display screen may be used.

Figure 3:
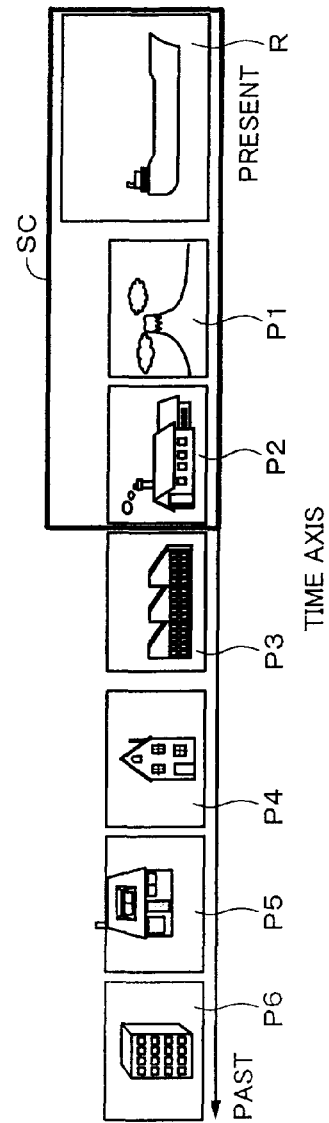
FIG. 3 is a schematic diagram describing an arrangement of images along a time axis according to the embodiment of the present invention.

FIG. 3 describes images displayed on the LCD 13 according to the embodiment. Reference letter R denotes an image that is currently being captured (hereinafter this image may be referred to as a currently captured image). Reference letter P denotes an image that has been captured and that is reproduced in the reproducing mode (thereinafter this image may be referred to as a reproduced image). The currently captured image R is followed by reproduced images P1, P2, P3, and so forth and arranged along the time axis. In FIG. 3, the right direction denotes a direction from the past to the present on the time axis, whereas the left direction denotes a direction from the present to the past on the time axis.

The LCD 13 may be either an LCD having an aspect ratio of 4 to 3 or a wide LCD having an aspect ratio of for example 16 to 9. In FIG. 3, reference letter SC denotes a display frame for the wide LCD. In this case, the currently captured image R and the reproduced images P1 and P2 are displayed at the same time. As will be described later, whenever the time dial 22 is rotated in the counterclockwise direction viewed from the top surface of the camera body 21, the time axis is varied from the present to the past.

To easily distinguish the currently captured image R from the reproduced image P, the size of the currently captured image R is larger than that of the reproduced image P. Instead, with different shape icons added to the currently captured image R and the reproduced image P, they may be distinguished.

Figure 4A:
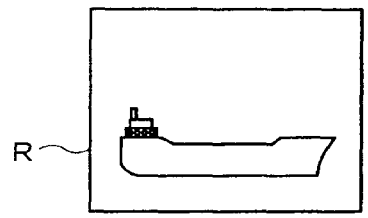
FIG. 4 is a schematic diagram describing data stored in an internal record medium and displayed according to the embodiment of the present invention.

FIG. 4 schematically shows display data that form images displayed on the LCD 13 and that are stored in the internal record medium 3. The currently captured image R shown in FIG. 4A is stored in the internal record medium 3. During the shooting mode, even if the operating unit 9 is not operated, the currently captured image R is updated at intervals of a frame or the like.

Figure 4B:
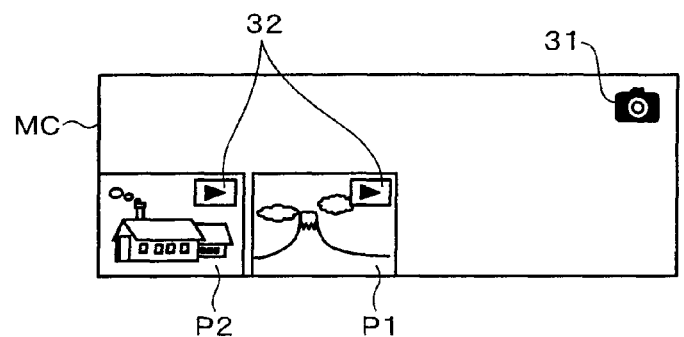

FIG. 4B shows OSD data that are stored in the internal record medium 3 besides the currently captured data R. The OSD data are data of icons combined with the currently captured data R. According to the embodiment of the present invention, the reproduced images P1 and P2 of a plurality of recently recorded images are stored in a storage area MC of the internal record medium 3 corresponding to the display frame SC. The reproduced image data P1 and P2 are read from the external record medium 11, decoded and size-reduced by the image processing unit 4, and then stored in the internal record medium 3. When there are OSD display size images corresponding to images that have been just captured, it is not necessary to read data from the external record medium 11.

Figure 4C:
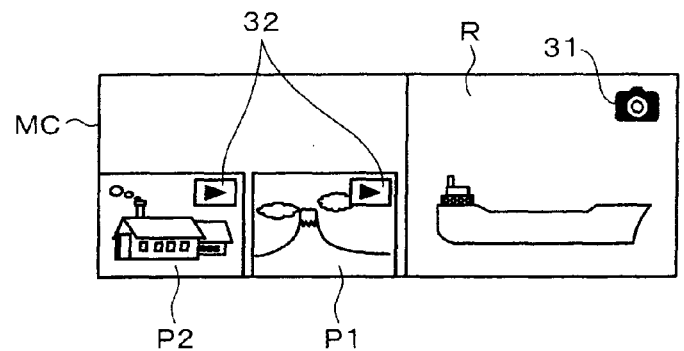

The size of the reproduced images P1 and P2 is smaller than that of the currently captured image R. Depending on the size of the image, the type thereof can be identified. The OSD data contain an icon 31 that indicates a currently captured image and an icon 32 that indicates a reproduced image. With these icons 31 and 32, the user can easily identify the types of the images. In the following description, illustrations of the icons 31 and 32 will be omitted. The OSD data may be composed of data having a plurality of hierarchical levels. As shown in FIG. 4C, the currently captured image R and the OSD data are combined and displayed on the wide type LCD 13.

Next, with reference to FIG. 5, transitions of display screens that take place when modes are switched will be described. In an example shown in FIG. 5, the display frame SC of the LCD 13 disposed on the rear surface of the digital camera is a wide type LCD having an aspect ratio of for example (16:9). Reference letter ST1 denotes a display screen that appears in a shooting mode. An image R of an object currently captured through a lens is displayed nearly at a center portion of the display frame SC. In the shooting mode, when a shutter button 24 is pressed, the object can be shot.

A plurality of keys, buttons, and so forth are disposed on the rear surface of the digital camera. They are for example a menu button 25 and a delete button 26.

When the time dial 22 is rotated with the thumb or the like of the user for one step in the counterclockwise direction viewed from the top surface of the camera body 21, the currently captured image R is moved rightward. The reproduced image P1 that has been just captured and obtained is displayed on the left of the currently captured image R. The reproduced image P2 captured before the reproduced image P1 is displayed on the left thereof. The display screen ST2 on which the currently captured image R and the reproduced images P1 and P2 are displayed at the same time is a coexistent state of the shooting mode and the reproducing mode. While the user is watching an image that has been just captured, he or she can decide a composition and so forth of an image that he or she will shoot.

When the time dial 22 is rotated for one more step in the counterclockwise direction viewed from the top surface of the camera body 21, a display screen ST3 appears on which only the reproduced images P1, P2, P3, and P4 are displayed. This state is the reproducing mode. A plurality of reproduced images P1, P2, P3, and P4 are displayed along the time axis.

FIG. 5 shows transitions of screens from the present to the past that take place when the time dial 22 is rotated in the counterclockwise direction viewed from the top surface of the camera body 21. When the time dial 22 is rotated in the clockwise direction viewed from the top surface of the camera body 21, transitions of screens from the past to the present take place. When the time dial 22 is rotated, the shooting mode and the reproducing mode can be switched as seamless operations. The rotating operation of the time dial 22, the mode switching, and the image switching have an affinity with the user's conceptual model. Thus, they have an excellent operability. Instead, the shooting mode and the reproducing mode may be directly switched not through the co-existent state thereof.

Figure 6:
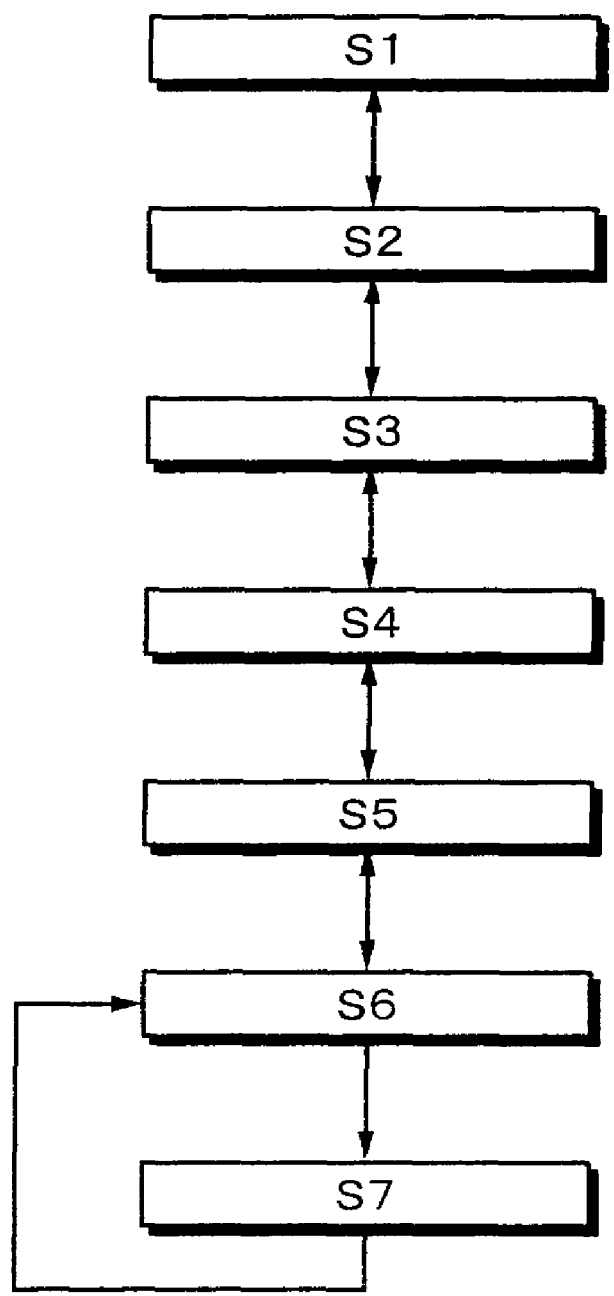
FIG. 6 is a flow chart showing transitions of operations when modes are switched.

FIG. 6 shows transitions of operations that take place when the time dial 22 is rotated. When the time dial 22 is rotated in the counterclockwise direction viewed from the top surface of the camera body 21, the operations change from the top to the bottom shown in FIG. 6. In contrast, when the time dial 22 is rotated in the clockwise direction viewed from the top surface of the camera body 21, operations change from the bottom to the top shown in FIG. 6. When the time dial 22 is rotated for one step (at step S2) in the shooting mode (step S1) in which only the currently captured image R is displayed, the co-existent state of the shooting mode and the reproducing mode in which both the currently captured image R and the reproduced image P are displayed takes place (at step S3).

When the time dial 22 is rotated for one step at step S4, the reproducing mode in which only reproduced images are displayed takes place (at step S5). When the time dial 22 is rotated for one step in the reproducing mode (at step S6), reproduced images are moved one by one along the time axis and displayed (at step S7).

When the time dial 22 is rotated in the reverse direction (in the counterclockwise direction viewed from the top surface of the camera body 21) in the reproducing mode, images are changed from the past to the latest along the time axis. When the time dial 22 is rotated for one step at relatively low speed, images are moved for one position each. When the time dial 22 is rotated for one step at high speed, images may be moved for a plurality of positions each.

When the time dial 22 is rotated in the reverse direction at high speed, in the state at step S5, the moving of images is momentarily stopped. In other words, even if the time dial 22 is rotated, the moving of reproduced images is stopped. After a momentary stop time elapsed, the co-existent state of the shooting mode and the reproducing mode of step S3 takes place. Since the momentary stop state is provided, the user can know that the reproducing mode is switched to the shooting mode. Since the moving of reproduced images stops for a short time, it does not prevent modes from being seamlessly switched.

To further improve the affinity with the user's conceptual model, it is preferred that the shooting mode, the co-existent mode of the shooting mode and reproducing mode, and the reproducing mode be indicated with animations corresponding to the operations of the time dial 22. FIG. 7 shows examples of animations of transitions of screens.

When the time dial 22 is rotated for one step in the counterclockwise direction viewed from the top surface of the camera body 21 while a display screen ST11 appears on which only the currently captured image R is displayed, a display screen ST13 on which the currently captured image R and reproduced images P1 and P2 are displayed appears through a transition display screen ST12. On the transition display screen ST12 between the display screens ST11 and ST13, while the time dial 22 is being rotated, the currently captured image R is gradually moved rightward and reproduced images are gradually entered from the left.

When the time dial 22 is rotated for one more step, as displayed on a transition display screen ST14, the currently captured image R is gradually moved rightward and exited from the display frame SC. Thereafter, a display screen ST15 appears on which only the reproduced images P1, P2, and P3 are displayed as a reproducing mode. In the reproducing mode, a frame-shaped cursor denoted by solid lines indicates the reproduced image P1 that is being currently focused. When the time dial 22 is rotated for one more step, the reproduced image P1 is exited from the screen and then the reproduced image P2 is focused.

As described above, when the time dial 22 is rotated, a plurality of images arranged one-dimensionally along the time axis are slid in the horizontal direction of the display screen so that the currently captured image R is followed by reproduced images.

Figure 8:
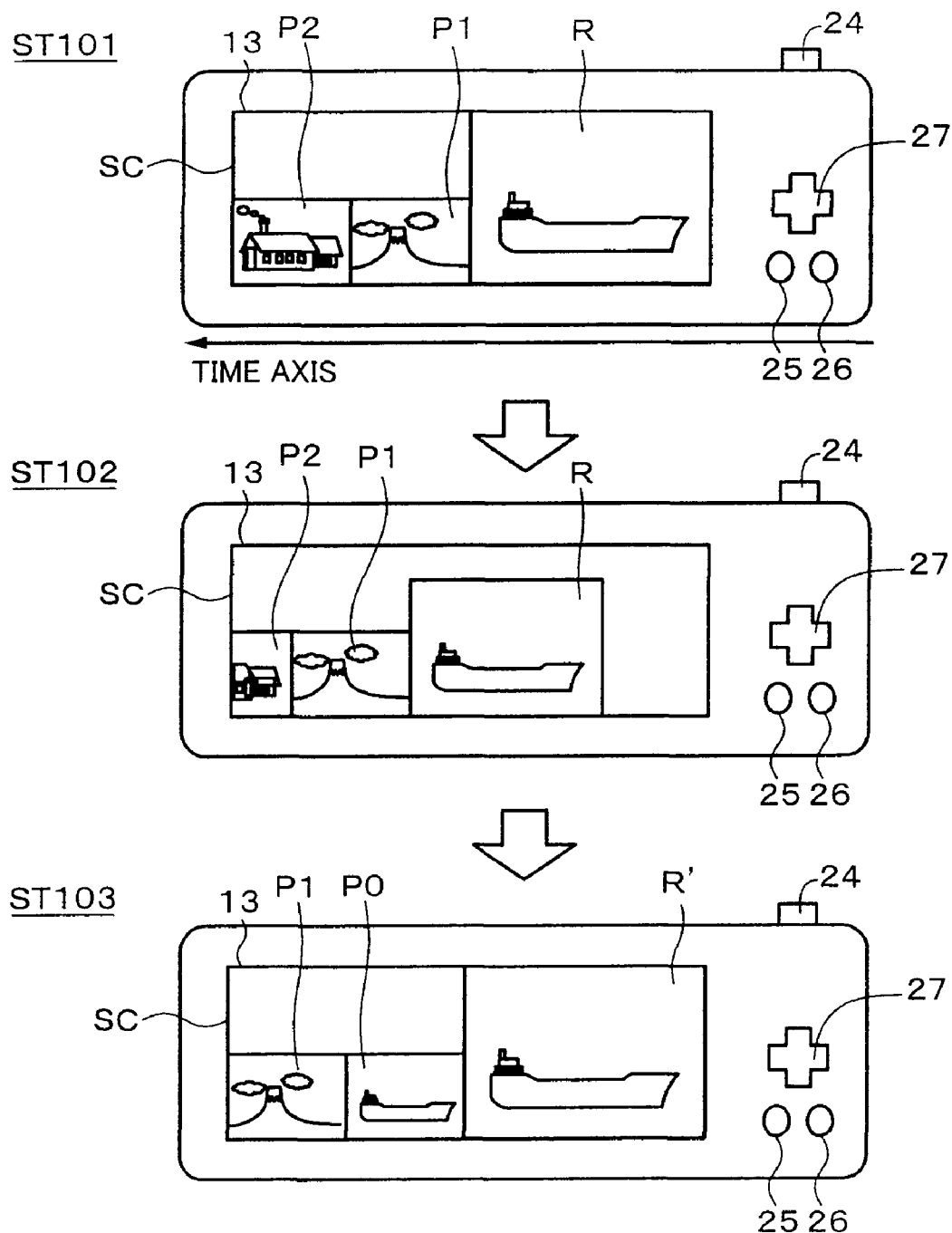
FIG. 8 is a schematic diagram showing transitions of display screens on the wide LCD when a shutter button is pressed.

Next, with reference to FIG. 8, the case of which a cross key 27 is used will be described. Reference letter ST101 denotes a normal display screen that appears when the power is turned on. A currently captured image R of an object that is being captured through the lens and a reproduced image P1 that has been just captured and obtained are displayed so that the currently captured image R is followed by the reproduced image P1 on the left thereof and they do not overlap. Since the currently captured image R and the reproduced image P1 do not overlap, the currently captured image can be prevented from being obstructed by the reproduced image. The reproduced image P1 is followed by a reproduced image P2 on the left thereof.

The display screen ST101 on which the currently captured image R and reproduced images P1 and P2 are displayed at the same time is a co-existent state of the shooting mode and the reproducing mode. In other words, when the shutter button 24 is pressed while the display screen ST101 appears, a new image can be recorded and a desired image can be displayed as a reproduced image. Thus, while the user is watching an image that has been just captured, he or she can decide a composition and so forth of an image that he or she will shoot.

When the shutter button 24 is pressed while the display screen ST101 appears, animations of transitions to a display screen ST103 through a transition display screen ST102 appear. On the transition display screen ST102, the size of the currently captured image R is gradually decreased and the currently captured image R is moved leftward. On the display screen ST103, a currently captured image R' of the object is followed by a reproduced (recorded) image P0 derived from the captured image R on the left of the currently captured image R'. The reproduced image P0 is followed by a reproduced image P1 on the left thereof. The transition display screen ST102 momentarily appears. The animations of transitions allow the user to know that the currently captured image R was changed to the reproduced image P0. The display screen ST103 allows any of the shooting mode and the reproducing mode to take place.

Figure 9:
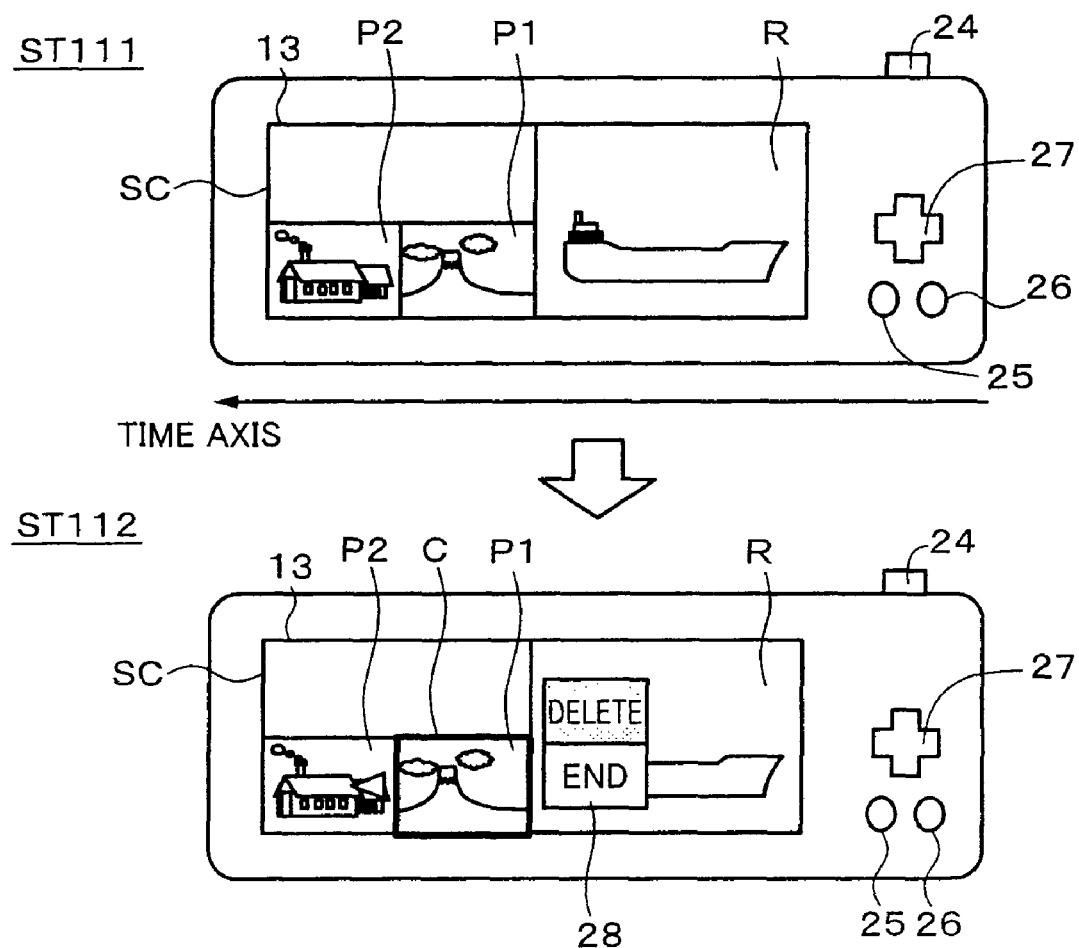
FIG. 9 is a schematic diagram showing transitions of display screens on the wide LCD when a deleting operation is performed with a delete button.

FIG. 9 shows transitions of screens in the co-existent state of the shooting mode and the reproducing mode in which the currently captured image R and the reproduced images P1 and P2 are displayed at the same time when a delete button 26 is pressed. When the delete button 26 is pressed while the transition screen ST111 appears, transitions to a display screen ST112 take place.

A frame shaped cursor C is displayed at a position corresponding to the reproduced image P1 so that the cursor indicates that the reproduced image P1 has been selected. A deletion dialog 28 is displayed at the position of the currently captured image R. When the left button of the cross key 27 is pressed, a reproduced image on the left of the cursor C (namely, a reproduced image earlier than the reproduced image at the position of the cursor C) can be selected. The deletion dialog 28 has "delete" and "end" which can be selected by the up and down buttons of the cross key 27. The selected item is highlighted.

While the cursor C indicates the reproduced image P1 and the "DELETE" of the deletion dialog 28 is highlighted on the display screen ST112, when an "OK" key is pressed, the selected reproduced image P1 is deleted. When the left or right button of the cross key 27 is operated, an image to be deleted is selected. The "OK" key is a mechanical key disposed on the camera body, a GUI key, a center portion of the cross key 27, or the like. According to this embodiment of the present invention, a desired reproduced image (captured image) can be deleted without need to switch from the shooting mode to the reproducing mode.

Figure 10:
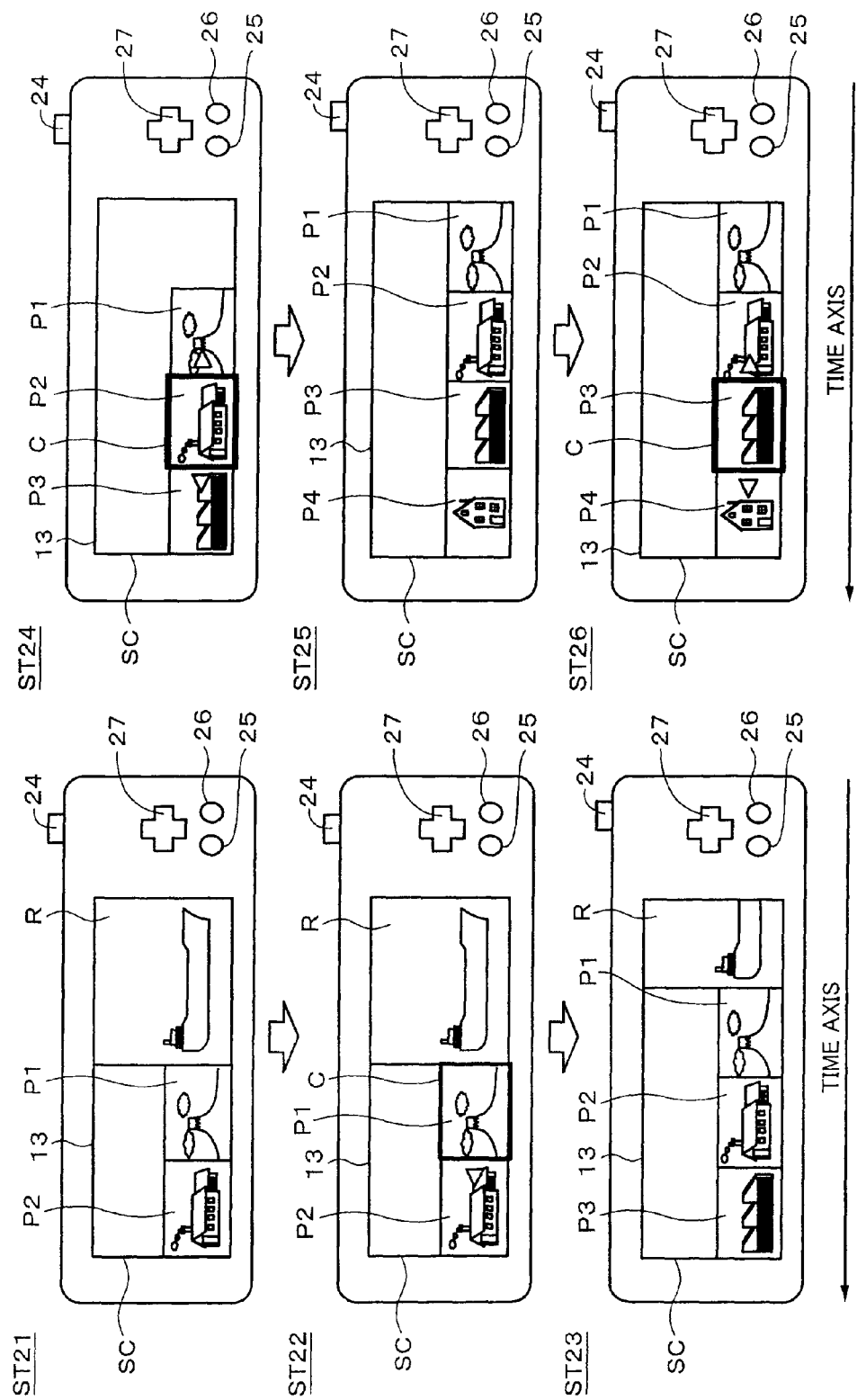
FIG. 10 is a schematic diagram describing switching of modes and transitions of display screens with a cross key as an operation key according to the embodiment.

Next, with reference to FIG. 10, another example of an operation using the cross key 27 will be described. On a display screen ST21 shown in FIG. 10, a currently captured image R and reproduced images P1 and P2 are displayed in the display frame SC of the LCD 13. In other words, the display screen ST21 is a co-existent state of the shooting mode and the reproducing mode. When the menu button 25 is pressed in this state, a menu with respect to the shooting mode is displayed in the display frame 13.

When the left button of the cross key 27 is pressed, a display screen ST22 appears on which the frame-shaped cursor C indicates the reproduced image P1. The state of which the reproduced image P1 is selected is the reproducing mode. An arrow cursor is also displayed beside the cursor C. The arrow cursor indicates that images on the left can be selected. When the menu button 25 is pressed in the reproducing mode, a menu with respect to the reproducing mode is displayed in the display frame SC.

When the left button of the cross key 27 is pressed again, animations of transitions to a display screen ST24 through a transition display screen ST23 appear. The transition display screen ST23 momentarily appears. On the display screen ST24, the currently captured image R is exited from the display frame SC. The cursor C indicates the reproduced image P2. Since reproduced images can be switched in both the directions, arrow cursors are displayed on both the sides.

When the left button of the cross key 27 is pressed again, animations of transitions to a display screen through a transition display screen ST25 appear. The transition display screen ST25 momentarily appears. On the display screen ST26, the cursor C indicates the reproduced image P3. Since reproduced images can be switched in both the directions, arrow cursors are displayed on both the sides.

With the cross key 27, modes can be seamlessly switched. In addition, images can be switched having an affinity with the user's conceptual model. In the reproducing mode, a reproduced image indicated by the cursor C can be displayed in an enlarged size or a reduced size.

Next, with reference to FIG. 11 and FIG. 12, the reproducing mode will be described in detail. In the state that a desired reproduced image is selected with the time dial 22 or the cross key 27, the selected image can be displayed in an enlarged size or a reduced size.

Figure 11:
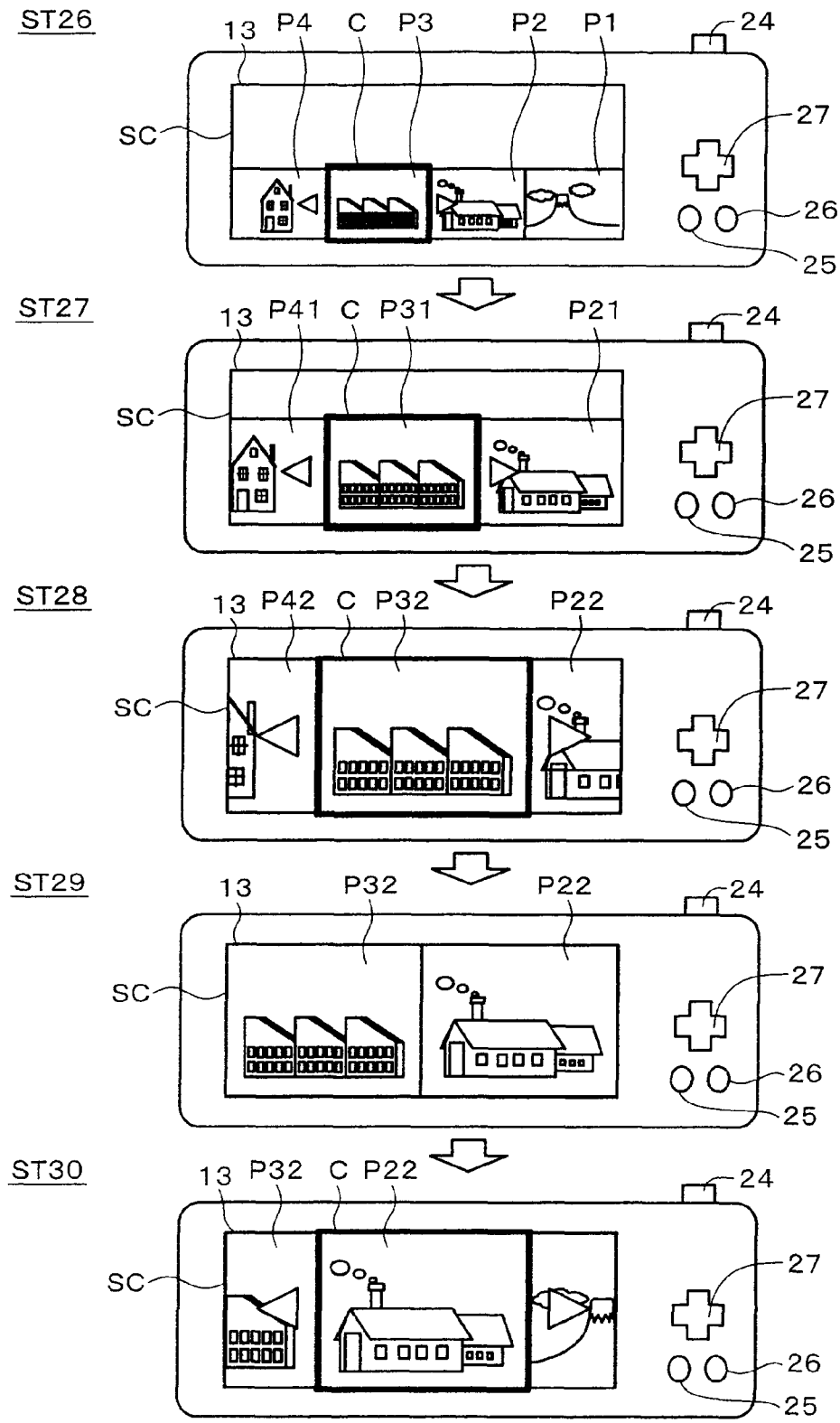
FIG. 11 is a schematic diagram describing a process of enlarging a selected reproduced image and displaying it in the reproducing mode.

FIG. 11 shows transitions of screens when a reproduced image is displayed in an enlarged size. A display screen ST26 is the same as the last display screen shown in FIG. 10. First, a tele key or "OK" key is pressed. The tele key is a mechanical key disposed on the camera body, a GUI key, or the like. The "OK" key is a mechanical key disposed on the camera body, a GUI key, a center switch of the cross key 27, or the like.

Animations of transitions of display screens until a display screen ST28 through a transition display screen ST27 appear according to the operation of the tele key or the "OK" key. Enlarged reproduced images P21, P31, and P41 displayed on the transition display screen ST27 are slightly larger than the original reproduced images P2, P3, and P4, respectively. An enlarged reproduced image P32 displayed at the center position on the display screen ST28 is larger than the reproduced image P31. When the selected reproduced image P3 is displayed as an enlarged image P32, the contents of the reproduced image P3 can be easily checked.

When the right button of the cross key 27 is pressed or the arrow cursor -> is pressed on the display screen ST28, the cursor C is moved rightward and enlarged reproduced images are moved as files. As a result, animations of transitions of display screens to a display screen ST30 through a transition display screen ST29 appear. The enlarged reproduced image P32 is displayed at the center position of the display screen ST30. Thus, enlarged images can be also moved as files.

Figure 12:
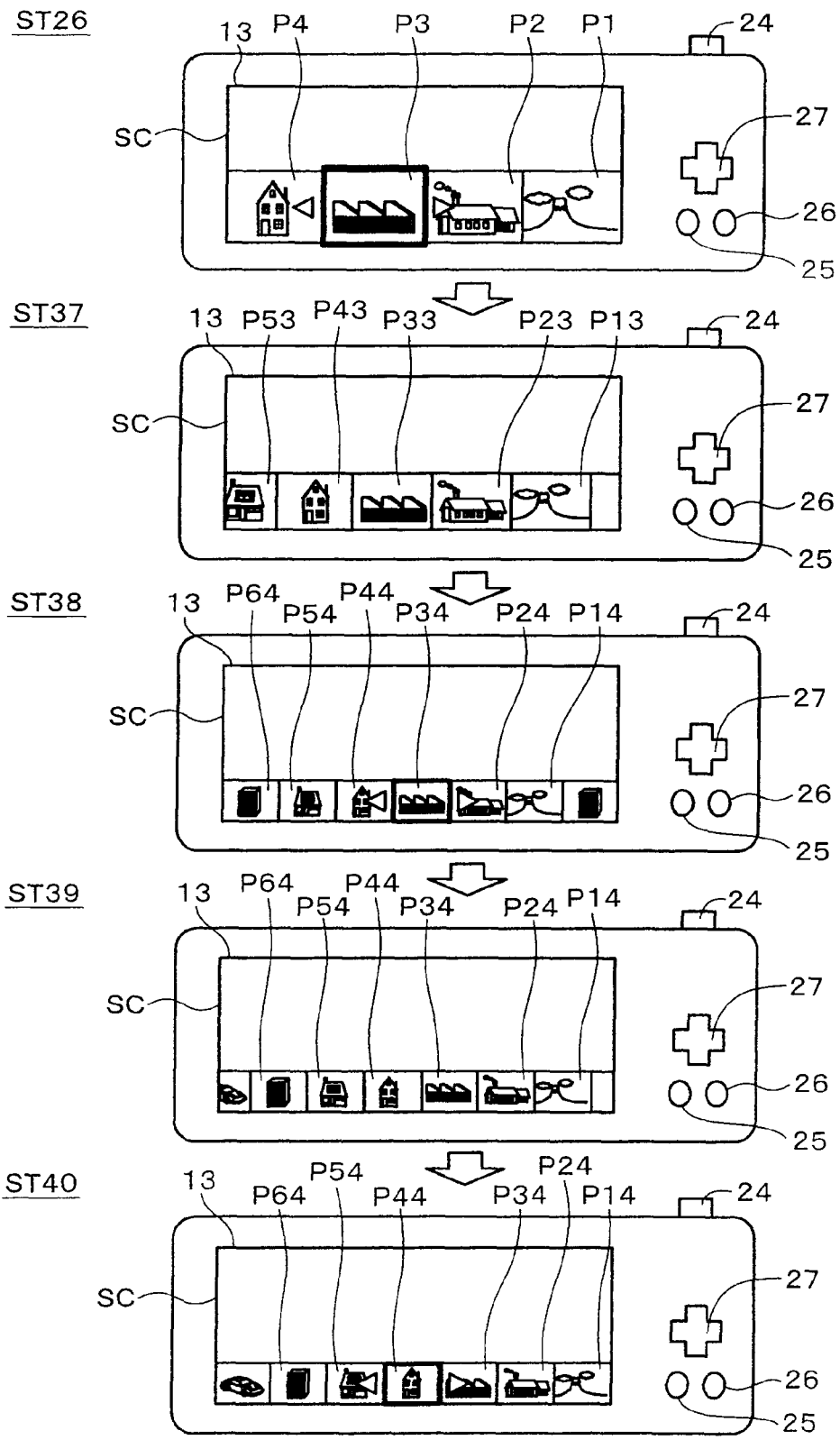
FIG. 12 is a schematic diagram describing a process of reducing a selected reproduced image and displaying it in the reproducing mode.

FIG. 12 shows transitions of screens when an image is displayed in a reduced size. A display screen ST26 is the same as the last display screen shown in FIG. 10. First, a wide key or the "OK" key is pressed. The wide key is a mechanical key of the camera body, a GUI key, or the like. The "OK" keys is a mechanical key disposed on the camera body, a GUI key, the center switch of the cross key 27, or the like.

Animations of transitions of display screens until a display screen ST38 through a transition display screen ST37 appear according to the operation of the wide key or the "OK" key. Reduced reproduced images P13, P24, P33, P43, and P54 displayed on the transition display screen ST37 are slightly smaller than original reproduced images P1, P2, P3, and P4, respectively. A reduced reproduced image P34 displayed at the center position on the display screen ST38 is smaller than the reproduced image P33. When the selected reproduced image P3 is displayed as the reduced image P34, the contents of a plurality of reproduced images followed by and preceded by the reproduced image P3 can be easily checked.

When the left button of the cross key 27 is pressed or the arrow cursor <- is pressed on the display screen ST38, the cursor C is moved leftward and reduced reproduced images are moved as files. As a result, animations of transitions of display screens to a display screen ST40 through a transmission display screen ST39 appear. A reduced reproduced image P44 is displayed at the center position of the display screen ST40. Thus, reduced images can be moved as files.

Figure 13:
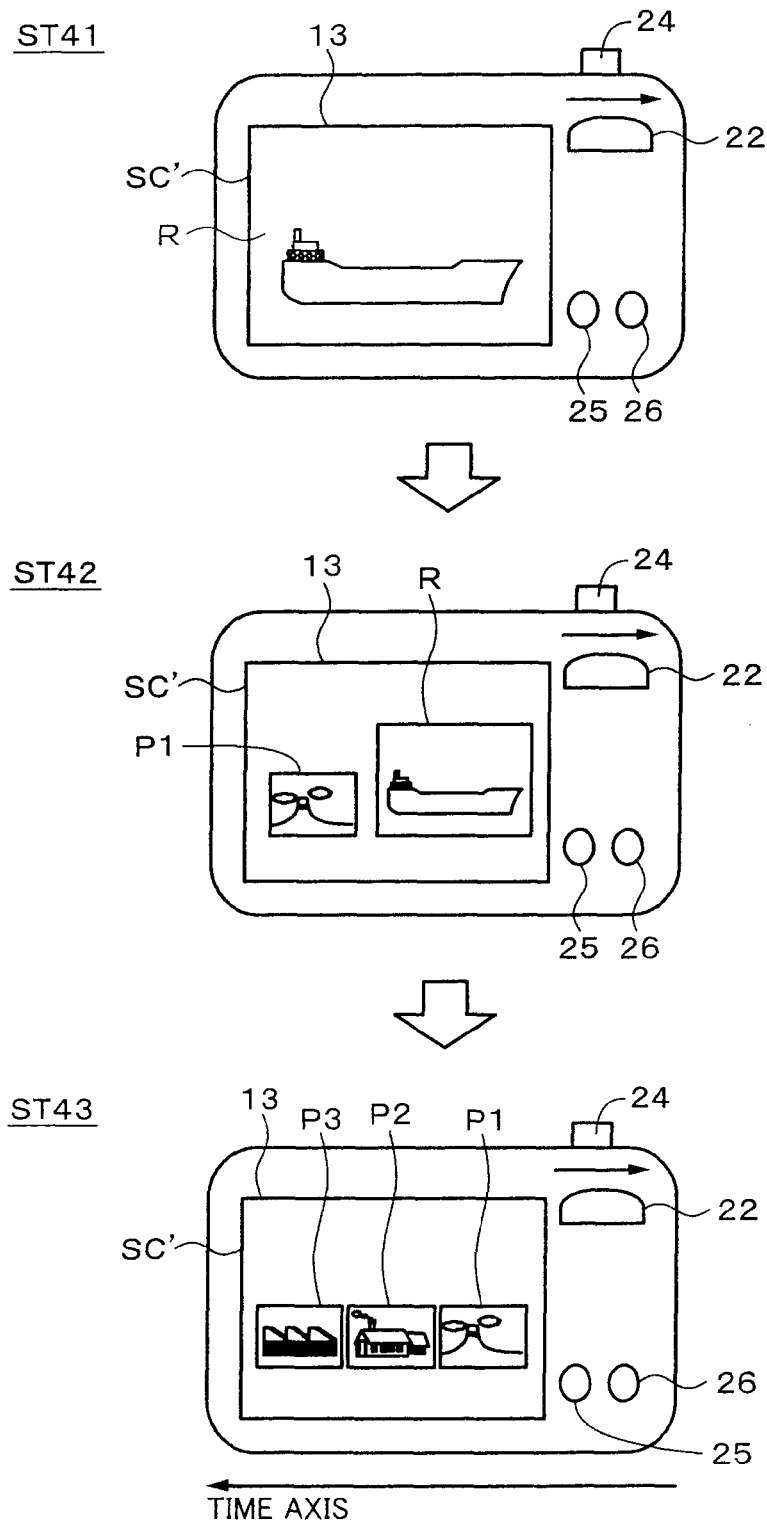
FIG. 13 is a schematic diagram showing transitions of display screens on an LCD having an aspect ratio of (4:3) when modes are switched.

In the foregoing description, the display frame SC of the LCD 13 is an oblong wide screen. However, according to the present invention, an LCD having a display frame SC whose aspect ratio is (4:3) may be used instead of the wide screen. In FIG. 13, reference letter SC' denotes a display frame whose aspect ratio is (4:3). Reference letter ST41 denotes a display screen that is a shooting mode. A currently captured image R of an object through a lens is displayed nearly at the center portion of the display frame SC. When the shutter button 24 is pressed in the shooting mode, the object can be shot.

When the time dial 22 is rotated for one step in the counterclockwise direction viewed from the top surface of the camera body 21, the currently captured image R is reduced and moved rightward. A reproduced image P1 captured immediately before the currently captured image R is displayed on the left thereof. A display screen ST42 on which both the currently captured image R and the reproduced image P1 are displayed at the same time is a co-existent state of the shooting mode and the reproducing mode. While the user is watching an image that has been just captured, he or she can select a new image that he or she will shoot.

When the time dial 22 is rotated for one more step in the counterclockwise direction viewed from the top surface of the camera body 21, a display screen ST43 appears on which only reproduced images P1, P2, and P3 are displayed. This state is the reproducing mode. A plurality of reproduced images P1, P2, and P3 are displayed along the time axis.

FIG. 13 shows transitions of screens from the present to the past that take place when the time dial 22 is rotated in the counterclockwise direction viewed from the top surface of the camera body 21. When the time dial 22 is rotated in the clockwise direction viewed from the top surface of the camera body 21, transitions of screens from the past to the present take place. When the time dial 22 is rotated, the shooting mode and the reproducing mode can be seamlessly switched.

Figure 14:
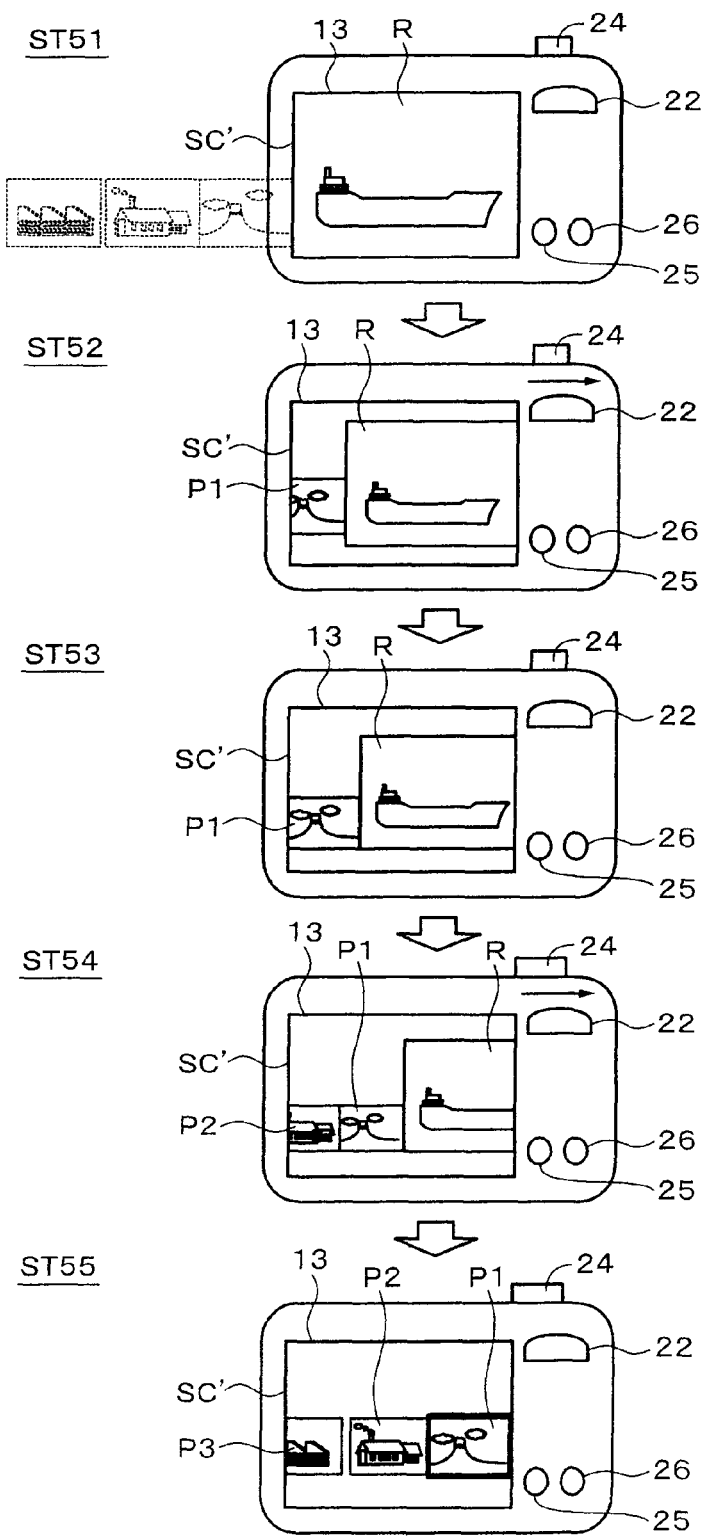
FIG. 14 is a schematic diagram showing animations of transitions of display screens on the LCD having the aspect ratio of (4:3) when modes are switched.

The transitions of the shooting mode, the co-existent mode of the shooting mode and the reproducing mode, and the reproducing mode are represented by animations according to operations of the time dial 22. FIG. 14 shows examples of animations of transitions of screens.

When the time dial 22 is rotated for one step in the counterclockwise direction viewed from the top surface of the camera body 21 on a display screen ST51 on which only a currently captured image R is displayed, transitions of display screens through a transition display screen ST52 to a display screen ST53 take place on which the currently captured image R and reproduced images P1 and P2 are displayed at the same time. While the time dial 22 is being rotated, the currently captured image R is gradually moved rightward and a reproduced image is gradually entered from the left of the screen between the display screens ST51 and ST53. The reproduced image P1 is displayed adjacent to the currently captured image R on the display screen ST53.

When the time dial 22 is rotated for one more step, the currently captured image R is gradually moved rightward and exited from the display frame SC' as shown on a transition display screen ST54. Thereafter, a display screen ST55 appears. Only the reproduced images P1, P2, and P3 are displayed on the display screen ST55 that is a reproducing mode. In the reproducing mode, a frame-shaped cursor denoted by solid lines indicates the reproduced image P1 that is being currently focused. When the time dial 22 is rotated for one more step, the reproduced image P1 is exited from the screen and the reproduced image P2 is focused (not shown).

The present invention is not limited to the foregoing embodiment. Instead, various modifications and ramifications may be made without departing from the spirit and scope of the present invention. For example, the present invention is not limited to a digital camera that records still images. Instead, the present invention may be applied to an imaging apparatus that records moving images and an imaging apparatus that can record both still images and moving images. When a moving image is recorded, for example the top image thereof is displayed on an LCD or the like.

The invention claimed is:

1. An image display apparatus, comprising:
   a display; and
   a control unit configured to control the display to display a current image of an object currently being captured by an imaging device and a previously captured image simultaneously,
   wherein the control unit is configured to control, responsive to an operation of a shutter button, the imaging device to capture the current image as a new previously captured image, and
   the control unit is configured to control, responsive to the operation of the shutter button, the imaging device to animate a gradual decrease in size of the new previously captured image on the display, the gradual decrease in size being at least a two-step decrease.

2. The image display apparatus according to claim 1, wherein the current image includes an icon different from an icon included in the previously captured image.

3. The image display apparatus according to claim 1, further comprising:
   an input device configured to receive a user input,
   wherein a frame surrounding a previously captured image is moved in response to the user input, the frame indicating a selected image.

4. The image display apparatus according to claim 3, wherein the selected image is deleted in response to further user input.

5. The image display apparatus according to claim 1, wherein the control unit animates the gradual decrease in size of the new previously captured image on the display while a previously captured image are displayed simultaneously.

6. The image display apparatus according to claim 5, wherein the display displays an image of the object currently being captured by the imaging device and the new previously captured image simultaneously after animation of the gradual decrease in size of the new previously captured image currently being captured.

7. The image display device according to claim 5, wherein the gradual decrease in size of the new previously captured image reduces the new previously captured image to a size of the previously captured image.

8. The image display apparatus according to claim 1, wherein the control unit controls the imaging device to transform the current image into the new previously captured image having a smaller size than the currently captured image.

9. The image display apparatus according to claim 8, wherein the control unit animates, on the display, a gradual decrease in size of the current image as the current image transforms into the new previously captured image.

10. The image display apparatus according to claim 9, wherein a lower edge of the current image aligns with a lower edge of the new previously captured image during animation on the display.

11. A method of causing an image display device to display an image, comprising:
    displaying, in a display, a current image of an object currently being captured by an imaging device;
    capturing, at the imaging device and in response to an operation of a shutter button, the current image as a new previously captured image; and
    animating on the display, by a control unit an in response to the operation of the shutter button, reduction in size of the new previously captured image, the reduction in size being at least a two-step reduction.

12. The method according to claim 11, wherein the current image includes an icon different from an icon included in the previously captured image.

13. The method according to claim 11, further comprising:
    receiving, at an input device, a user input; and
    moving, on the display, a frame surrounding a previously captured image in response to receipt of the user input.

14. The method according to claim 13, further comprising:

deleting, at the control unit, an image surrounded by the frame in response to receipt of a further user input.

15. The method according to claim 11, wherein the current image is displayed simultaneously with a previously captured image.

16. The method according to claim 15, wherein the size of the new previously captured image is reduced to a size of the previously captured image.

17. The method according to claim 16, further comprising:

displaying, at the display, the new previously captured image and a new current image of the object currently being captured by the imaging device simultaneously.

18. The method according to claim 11, wherein the animating includes conversion of the current image into the new previously captured image by reducing a size of the current image to a size of the new previously captured image, a lower edge of the current image aligning with a lower edge of the new previously captured image during animation on the display.

19. An image display apparatus comprising:

means for simultaneously displaying a current image of an object currently being captured and a previously captured image;

means for capturing, in response to an operation of a shutter button, the current image as a new previously captured image;

means for animating, in response to the operation of the shutter button, a reduction in size of the new previously captured image to a size of the previously captured image, the reduction in size being at least a two-step reduction; and means for simultaneously displaying the new previously captured image and a new current image of the object currently being captured.

20. The image display apparatus according to claim 19, wherein the means for animating converts the current image into the new previously captured image by reducing a size of the current image to a size of the new previously captured image, a lower edge of the current image aligning with a lower edge of the new previously captured image during animation on the display.

* * * * *